July 17, 1934. A. D. ROBBINS Re. 19,244

HIGH PRESSURE LUBRICATING APPARATUS

Original Filed Oct. 25, 1927 2 Sheets-Sheet 1

INVENTOR.
AZOR D. ROBBINS
BY John A. Watson
ATTORNEY.

July 17, 1934. A. D. ROBBINS Re. 19,244

HIGH PRESSURE LUBRICATING APPARATUS

Original Filed Oct. 25, 1927 2 Sheets-Sheet 2

INVENTOR.
AZOR D. BOBBINS
BY John A. Watson
ATTORNEY.

Reissued July 17, 1934

Re. 19,244

UNITED STATES PATENT OFFICE 19,244

HIGH PRESSURE LUBRICATING APPARATUS

Azor D. Robbins, New Brunswick, N. J., assignor, by mesne assignments, to The Lubrication Corporation, South Bend, Ind., a corporation of Delaware Original No. 1,881,096, dated October 4, 1932, Serial No. 228,556, October 25, 1927. Renewed November 30, 1931. Application for reissue July 15, 1933, Serial No. 680,620

8 Claims. (Cl. 285—170)

This invention relates to lubricating apparatus adapted for motor vehicles, industrial and other machinery, and particularly the invention relates to apparatus, or a system of means, for creating high pressure upon the lubricant, which is employed for the purpose of lubricating the bearings of the machinery.

Among the objects of my invention may be noted the following: To provide apparatus through the medium of which pressure may be applied to a column or body of grease for the purpose of forcing the same into a fitting or grease cup, or into and through a fitting or grease cup, and into the duct or conduit leading to the bearings requiring the same; to provide apparatus by means of which pressure may be applied to a column of grease to force the same from a gun or compressor, through a coupling, and into a receptacle for passage to a conduit, duct or gland through which the lubricant is forced to the bearing; to provide a combination of specialized means comprising a grease gun or compressor, a connector, a coupling and a fitting or grease cup adapted to lubricate the bearings of machinery, and especially automotive vehicles; to provide a combination of elements, as set forth in the foregoing, capable of being utilized for conveying grease or oil, under pressure, to the bearings of machinery, regardless of where the entrance to the bearing may be located, and regardless of how difficult of access said entrance may be; to provide a combination of means, as set forth in the foregoing, through the medium of which grease under high pressure can be forced into a bearing from practically any position or direction or angle at which the apparatus may be held relatively to the entrance to the conduit leading to the bearing; and to provide apparatus of the kind noted in the foregoing which can be quickly applied to the fitting at the entrance to the bearing, or duct leading thereto, and quickly detached, thus facilitating greasing or oiling the bearings and enabling the process of greasing or oiling to be carried out with great facility and rapidity, regardless of the position of the fittings applied to the glands or ducts leading to the bearings or the angle at which the said fittings and the coupling means may have to be arranged.

With the foregoing objects in view and others which will be detailed during the course of this description, my invention consists in the parts, features, elements and combinations thereof hereinafter described and claimed.

In order that my invention may be clearly understood, I have provided drawings wherein.

Figures 1, 2:
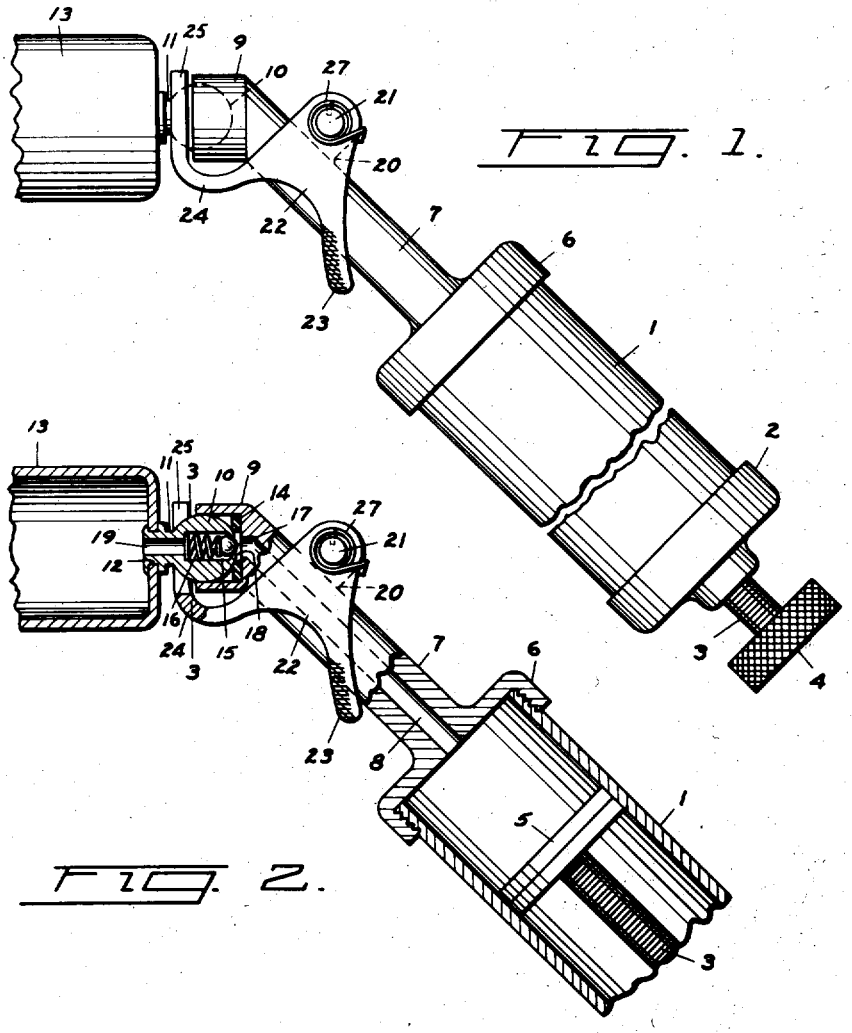
Figure 1 is a view showing in side elevation an apparatus embodying my invention, parts being broken away, in order to curtail the view, and because of the limitations of the sheet.
Figure 2 is a view showing the apparatus of Figure 1 in sectional elevation.
Figure 3:
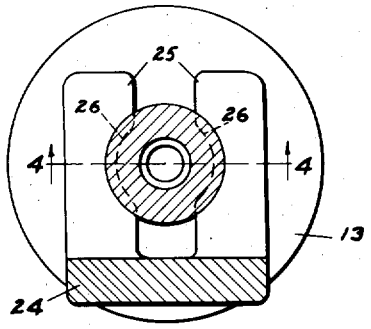
Figure 3 is a view showing parts in section and elevation, the view being taken substantially on the line 3—3 of Figure 2.
Figure 4:
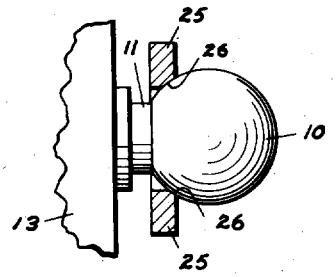
Figure 4 is a view of Figure 3 taken substantially on the line 4—4 of Figure 3.

In the drawings I have shown, for demonstration of my invention, an old and simple form of pressure gun the capacity of which, according to size and construction, is sufficient for the purpose of forcing the lubricant through ducts or conduits wherein there is little or no resistance to the passage of lubricant to the bearings. Frequently, due to accumulation of grit, sand, dust and other fine particles in the grease, the latter becomes so stiff, at the entrance to the ducts, as to offer high resistance to the passage of the grease to the bearings. It then becomes necessary to employ a gun or compressor, of the lever or booster type, having a high pressure capacity of several thousand pounds to the square inch. Such guns are within the contemplation of my invention, and the gun shown in the drawings is intended to be indicative thereof.

Referring to the drawings, Figures 1 to 4, the numeral 1 indicates the grease gun or compressor provided with a removable cap 2, at its outer end, through the threaded collar of which passes a screw-threaded piston-rod 3 having at its outer end a handle 4 of any usual form by which to turn the piston-rod, and carrying at its inner end a piston 5 made of any suitable material and being of any suitable construction enabling it to force the grease out of the delivery end of the gun and maintain a tight or sealed contact with the interior surface of the gun cylinder. This gun may be of any suitable form, many different kinds of which are now in use, the particular form shown being used here merely as an illustration of a means for creating pressure upon the grease to force it from the instrument and into the conduit leading to the bearing or into a grease cup at the outer end of the conduit.

The outer end of the cylinder 1 is provided with a removable cap 6 internally screw-threaded and applied to the end of the cylinder, said cap having formed integrally therewith an elongated, metal pipe-hose 7, the longitudinal passage 8 therethrough terminating at its outer or delivery end in the chamber or socket of a coupling device or nozzle 9 cylindrical in form and extended at an angle to the hose 7 and having an internal, smooth surface, said coupling being adapted to receive the spherical outer end 10 of a small grease cup or fitting, the inner end of which is reduced, is of cylindrical form and elongated to form a neck 11 which may be provided with a double flange or circumferential groove 12 applied to the outer end of a grease cup 13. The grease cup 13 is of large capacity and may be of any suitable form provided with internal pressure means adapted to force the grease therefrom into the conduit leading to the bearing. The fitting, which has little capacity, may be applied as a closure directly to the end of the conduit.

The coupler end of the hose 7 is so formed as to provide a rigid shoulder against which a gasket 14 is set, said gasket having a large aperture therein of slightly greater diameter than the diameter of the passage 8 through the hose 7, and also of slightly greater diameter than the passage through the fitting 10. The function of this construction will be presently described. The fitting 10, in its spherical part, is provided with a chamber 15 in which is located a light, coiled expansion spring 16 seated on a shoulder at the bottom of the chamber and normally expanded to hold a closure 17 in position against a seat 18, the seat and closure forming a valve structure adapted to check the flow of grease or lubricant from the fitting, but to allow the passage of grease into the fitting from the passage 8 in the hose 7 through the gasket 14 and coupler 9. The passage 19 from the fitting into the grease cup or conduit is reduced in diameter and leads from the chamber 15.

The hose 7, which may be of any desired length, has formed integral therewith a lug or ear 20, substantially at a right-angle to the surface of the hose through which is passed a pin 21 forming the pivotal support of a bell-crank lever 22 extended at one end into a thumb-piece or handle 23, and at the other end curved, as at 24, into angular relation with the body of the lever 22 and hose 7. The extended end of the curved portion of the bell-crank lever is bifurcated, and the prongs 25 of the bifurcated portion are provided substantially centrally thereof on one surface with grooved portions 26. The distance between the prongs 25 of the bifurcated end is a little greater than the external diameter of the neck 11 of the spherical fitting, and the grooves in the surfaces of the prongs 25 enable the bottom portion of the spherical end of the fitting to be received in the bifurcation for creating a tight hold upon the fitting, and prevent the instrument from being accidentally separated from the fitting. Moreover, the interaction of the spherical end of the fitting with the bifurcated portion of the bell-crank lever is such that, when the latter is shifted into engagement with the fitting, the bifurcated portion and the socket portion of the coupling operate as a clamp to hold the instrument and the fitting together. The bell-crank lever 22 may be caused to fit with some friction upon its pin 21, so as to prevent too free movement of the lever upon its fulcrum, thus enabling the lever to maintain a substantially strong frictional hold upon the fitting; and a spring 27 may be coiled about the pin 21 and bear upon the lever 22 to hold the same normally in clamping position.

From the construction described in the foregoing, it will be seen that, when the lever is turned upon its fulcrum so that its bifurcated end will be out of contact with the ball of the fitting, the coupler 9 may be quickly applied to the ball of the fitting, the latter entering the socket of said coupler until it contacts with the gasket 14. The lever is then released or shifted to swing upon its fulcrum 21, whereupon the prongs 25 will receive between them, primarily, the reduced neck 11 of the fitting and then the grooves 26 of the prongs will receive the bottom of the ball portion of the fitting, the relation of the fulcrum of the lever and the prongs being such as to cause the latter to swing outwardly into contact with the bottom of the ball, force the latter into the coupler and into contact with the gasket 14, and clamp the ball tightly in the socket of the coupling 9 and against the gasket 14. Thus the prongs 25 and the coupler 9 constitute a clamp-socket for firmly holding the fitting in operative connection with the coupler, so that, when pressure is applied to the mass of grease within the gun, it will force the closure 17 from its seat, compress the spring 16, and enable the grease to pass into the cup or receptacle 13. The prongs 25 have a camming action upon the ball of the fitting, thus creating the clamping action in cooperation with the coupler 9. The engagement or contact between the clamp coupler and the ball of the fitting does not, however, prevent the instrument or gun from being shifted circularly and also inwardly and outwardly in angular directions relatively to the fitting and grease cup or receptacle into which the grease is being forced. Thus, the gun or compressor is enabled to perform its functions in all the difficult positions and normally inaccessible positions of the fitting when arranged in the usual places on the machinery, the bearings of which are to be lubricated. Uncoupling the gun from the fitting is easily and quickly accomplished, as is also the coupling action, by pressure upon the handle 23 of the bell-crank lever, in one or the other direction; and it will be seen that the coupling and uncoupling can be accomplished by one hand of the operator, while the other hand holds the gun at the desired angle, or the angle at which it is necessary to accomplish the function of forcing grease through the fitting into the receptacle. The aperture in the gasket, as before mentioned, is of greater diameter than the passage 8 through the pipe 7, or the chamber 15, or entrance thereto, in the spherical member 10 of the fitting, in order that the gun may be shifted as desired and, as set forth in the foregoing, without blocking the passage into the spherical member of the fitting.

Figure 5:
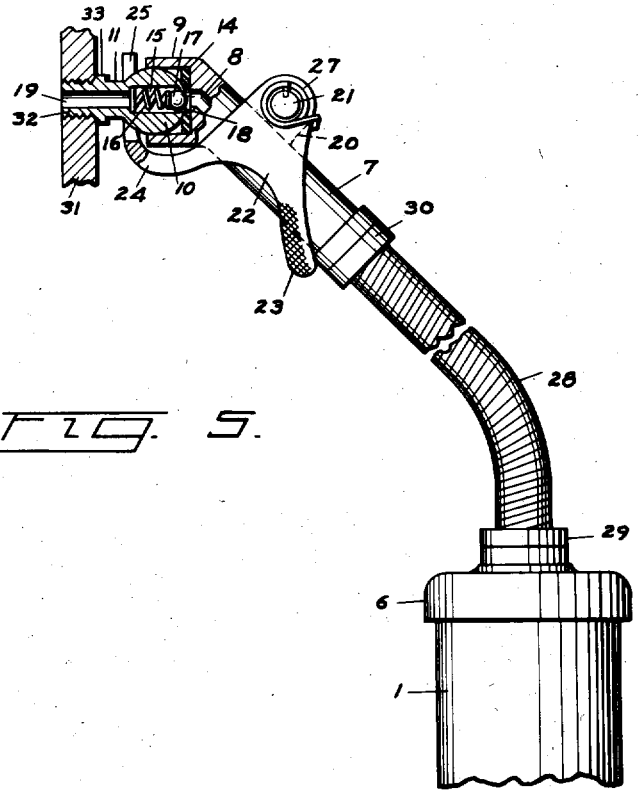
Figure 5 is a view similar to Figure 1 showing another form of my invention.

In Figure 5 of the drawings, I have shown a form of my invention in which a flexible hose 28 is arranged as a portion of the connection between the gun and the coupler. This hose may be of any of the forms now on the market and in use for the purpose, viz., either a braided metal hose, a spirally wound metal hose, or a ball-jointed or ball-link hose, the form shown being merely for the purpose of illustration. The hose 28 is removably attached at 29 to the delivery end of the gun by any suitable form of coupling means, and the outer end of the hose is detachably secured at 30 by any suitable coupling means to the coupler 9 through the medium of the rigid pipe portion 7 of any desirable length; and the flexible hose 28 may be of any length required, according to the use or the difficulty of access to bearings.

In other respects, the gun structure of Figure 5 is the same as that of Figures 1 and 2; and it will be understood that the pipe 7 in both the forms of my invention may be as long as may be required, considering the conditions under which the gun is to be used.

From the foregoing it will be seen that I have provided a lubricating apparatus or system of means consisting of a gun or compressor, a hose or conduit, a coupler and a fitting, which can be used in practically any relation and under any condition required; and it will be understood, with reference to Figure 5, that the fitting, instead of being applied to a grease cup or receptacle, may be applied to the machinery 31 at the other end of the gland or duct leading to the bearing, said fitting for this purpose having the inner end of its neck portion 11 provided with an externally screw-threaded extension 32 adapted to be fitted into the screw-threaded entrance to the said duct leading to the bearing of the machinery. A circumferential flange or shoulder 33, which may be made angular for the application of a wrench, is formed on the neck 11, the same operating also as a stop to prevent the fitting from being entered too far into the tapped hole to prevent the coupling lever from being readily applied to the fitting as described.

I claim:

1. A coupling for lubricating apparatus comprising, a cylindrical socket and a bifurcated jaw cooperating therewith to embrace a fitting, said jaw being carried by a bell-crank lever pivotally mounted upon the coupling, and a spring surrounding the pivot and yieldingly holding the lever to its work.

2. A coupling for lubricating apparatus comprising, a member having a cylindrical socket and a yieldingly mounted bifurcated lever for cooperation with said member, the two being adapted to receive a circular fitting and to hold the same tightly in the socket, the prongs of the bifurcated member having their inner surface grooved to closely cooperate with the circular fitting.

3. A lubrication coupler comprising, a nozzle having a socket portion the axis of which is directed at an angle to the axis of the body thereof, said socket being provided with a chamber, a coupling lever pivotally mounted on the nozzle and having a bifurcated end portion overhanging said socket and adapted clampingly to secure a fitting in said chamber, said bifurcated portion terminating at a place beyond the longitudinal axis of the socket and chamber.

4. A quick detachable lubrication coupling adapted to engage a ball-shaped fitting comprising, a nozzle having a ball receiving socket portion, a coupling lever pivotally associated with said nozzle, said coupling lever adapted to engage said fitting and clampingly to secure the same against said socket for rotatable movement relative thereto, and means for urging said lever in a direction to clamp said fitting against said socket.

5. A quick detachable lubrication coupling for a fitting having a substantially spherical contact portion comprising, a nozzle having a fitting receiving socket, adapted to engage said fitting to form a lubricant tight joint capable of substantially universal movement, and a coupling lever pivoted adjacent said nozzle for engaging said fitting and drawing the same into joint forming relation with said socket.

6. A quick detachable lubrication coupling adapted to engage a fitting co-operative with the coupling to form a lubricant tight joint therewith, comprising, a nozzle having a fitting receiving socket, a coupling lever pivotally mounted adjacent said socket, a portion of said coupling lever overhanging said socket to engage said fitting and relatively to draw the same into joint forming relation with said socket, and means for urging said lever in a direction to effect said drawing.

7. A quick detachable lubrication coupling adapted to engage a fitting having a continuous smooth surface provided with an opening for the passage of lubricant comprising, a nozzle having a contact portion adapted to engage a portion of said surface around said opening to form a lubricant tight joint therewith, and a coupling lever pivotally carried by said nozzle for engaging another portion of said surface to draw said fitting and nozzle into joint forming relation.

8. In a lubricating device, means for making a quick attachable-detachable fluid tight connection with a lubricant receiving fitting having an inlet opening and a nozzle engageable portion of spherical contour surrounding said opening comprising, an inflexible nozzle member including a conduit portion and a seal effecting end portion, said end portion having a seal effecting seat adapted to effect a seal with the fitting completely about a zone of said spherical portion of the fitting said zone being substantially larger than the said opening in said fitting whereby to maintain the seal over a substantial range of angular relationships between the axis of the fitting inlet and the axis of said nozzle end portion, said conduit and end portions being rigidly interconnected with their axes disposed at an angle less than a straight angle and greater than a right angle to one another whereby the range of intercommunication between the nozzle and a fitting is increased.

AZOR D. ROBBINS.